(12) United States Patent
Deptala et al.

(10) Patent No.: US 8,790,506 B2
(45) Date of Patent: Jul. 29, 2014

(54) METHOD OF PURIFYING A HYDROGEN STREAM USING AN ELECTROCHEMICAL CELL

(76) Inventors: Alexander David Deptala, Spring Valley, CA (US); Daniel Alvarez, Jr., Oceanside, CA (US); Arthur Deptala, Spring Valley, CA (US)

( * ) Notice: Subject to any disclaimer, the term of this patent is extended or adjusted under 35 U.S.C. 154(b) by 594 days.

(21) Appl. No.: 12/731,114

(22) Filed: Mar. 24, 2010

(65) Prior Publication Data

US 2011/0233072 A1 Sep. 29, 2011

(51) Int. Cl.
*C01B 3/50* (2006.01)
*C01B 3/02* (2006.01)

(52) U.S. Cl.
USPC ............... 205/763; 205/764; 205/765

(58) Field of Classification Search
USPC ................................ 205/763–765
See application file for complete search history.

(56) References Cited

U.S. PATENT DOCUMENTS 3,475,302 A * 10/1969 Langer et al. ............ 205/639
4,620,914 A * 11/1986 Abens et al. ............. 204/265
4,911,803 A * 3/1990 Kunz ...................... 205/764
5,840,174 A * 11/1998 Lehmann et al. ......... 205/763

* cited by examiner

*Primary Examiner* — Arun S Phasge
(74) *Attorney, Agent, or Firm* — Oakwood Law Group, LLP; Yuchien Wei

(57) ABSTRACT

A method of purifying a hydrogen stream using an electrochemical cell having an enclosed electrically conductive cylindrical outer shell and a hollow wet polymeric membrane located within and parallel to the longitudinal axis of the cylindrical member which provides an inner compartment and an outer compartment. An electrode having a longitudinal axis is located within the inner compartment and is spaced from the hollow polymeric membrane. A gas inlet for feeding a hydrogen stream that is to be purified communicates with the inner compartment and a gas outlet is provided for passing purified hydrogen gas thru the cylindrical outer shell. The electrode within the hollow wet polymeric membrane is connected to an anode terminal of a dc supply with an electrical conductor and the outer shell of the cylindrical shaped member is connected to a cathode terminal of the dc supply with another electrical conductor.

18 Claims, 3 Drawing Sheets

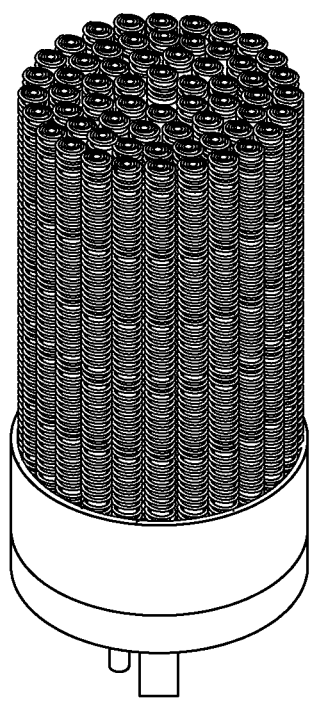
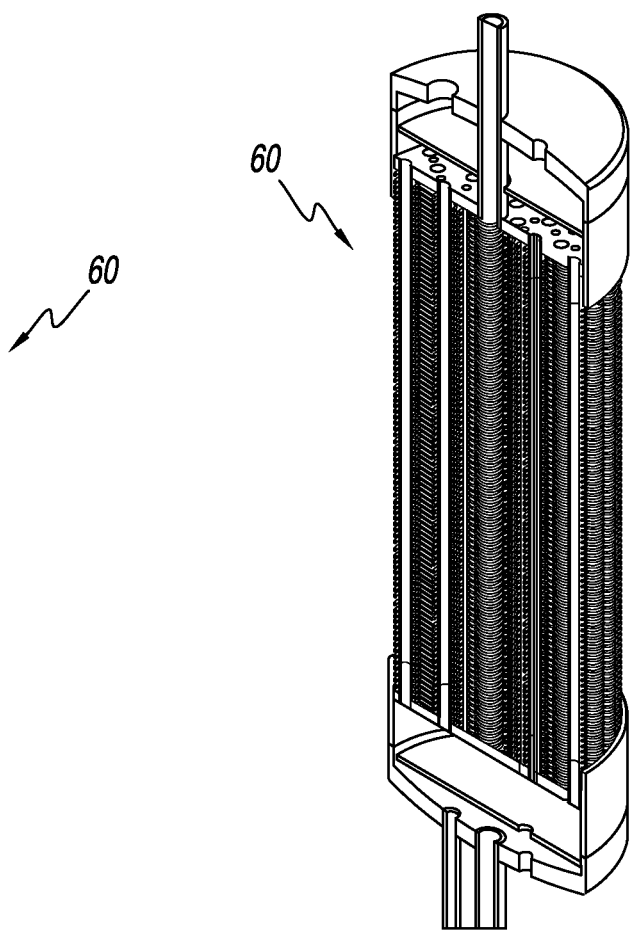
FIG. 6
FIG. 7

METHOD OF PURIFYING A HYDROGEN STREAM USING AN ELECTROCHEMICAL CELL

BACKGROUND OF THE INVENTION

Field of the Invention

The present invention relates to an electrochemical cell for the separation and purification of a hydrogen stream.

Description of Related Art

Methods and systems for the separation and purification of hydrogen is known in the prior art. More specifically, by way of example, U.S. PreGrant Publication No. 2007/0246373 to Ludlow; et al. discloses an integrated electrochemical hydrogen separation system where an electrical potential is applied between a first electrode and a second electrode of an electrochemical cell. The first electrode has a higher electrical potential with respect to zero than the second electrode. Electrical current flows through the cell as hydrogen is ionized at the first electrode and pumped across the cell. The hydrogen outlet flow and pressure from the cell can be controlled by adjusting the potential and current provided by the power supply.

U.S. Pat. No. 7,601,207 to Moulthrop, et al. discloses a gas recovery system having gas dryer in fluid communication with and downstream of a gas source, and an electrochemical compressor in fluid communication with and downstream of the gas dryer. The gas dryer is disposed to receive the gaseous stream and produce a delivery stream without moisture and a slipstream having moisture. The electrochemical compressor is disposed to receive the slipstream at a first pressure and produce a compressed stream at a second pressure greater than the first pressure.

U.S. Pat. No. 7,175,751 to Venkatesan, et al. discloses electrochemically purifying an impure stream of hydrogen. Hydrogen is absorbed into a gas diffusion anode from an impure hydrogen stream and oxidized to form hydrogen ions and electrons which are released into an alkaline solution. An electrolytic cathode also positioned in the alkaline solution decomposes water to form hydrogen and hydroxyl ions which combine with the hydrogen ions to maintain equilibrium of the system.

U.S. Pat. No. 6,821,664 to Parks, et al. discloses operating a fuel processing reactor to convert a hydrocarbon into reformate by; flowing reformate through a first pressure regulator to reduce the pressure of the reformate; supplying reformate from the first pressure regulator to a fuel cell to generate electrical power; flowing a portion of the reformate from the fuel processor to a second pressure regulator to reduce the pressure of the reformate while generating the electrical power with the fuel cell; and supplying reformate from the second pressure regulator to the hydrogen purification system while generating the electrical power with the fuel cell.

U.S. Pat. No. 6,464,756 to Plee discloses a predominantly hydrogen gaseous flow streams containing contaminating amounts of at least carbon monoxide and/or nitrogen impurities which are purified by PSA adsorption of such impurities therefrom, via transport over a faujasite zeolite adsorbent, where the Si/Al ratio of which ranges from 1 to 3, and at least 85% of the aluminum tetrahedra comprising the crystal lattices being combined with lithium and calcium cations, the lithium/lithium+calcium ratio therein being at least 70%.

U.S. Pat. No. 6,436,352 to Succi, et al. discloses a the removal of gaseous impurities from an impure gas stream of hydrogen contaminated with carbon monoxide, and with one or more additional impurities such as carbon dioxide, oxygen, nitrogen, water, methane. The impure gas stream is first contacted with elemental nickel in a first reaction zone under nickel-carbonyl forming conditions thereby converting substantially all the carbon monoxide to nickel carbonyl which produces a partially purified gas stream. The partially purified gas stream is then contacted with $Ti_2Ni$ or certain manganese-containing alloys in a second reaction zone to produce a fully purified gas stream.

U.S. Pat. No. 6,168,705 to Molter, et al. discloses a cell module with accessory components mounted in a single framework. The module consists of a number of single cells each capable of purifying and ultimately producing hydrogen gas at pressures exceeding 2000 psi. The process comprises introducing a contaminated hydrogen stream to a cell having an anode and a cathode with an electrolyte membrane disposed therebetween. The hydrogen is oxidized on the anode to protons which electrochemically migrate across the membrane to the cathode where they recombine with electrons which have passed through an external power source. The contaminants exit the anode side of the cell while the purified hydrogen exits the cathode side of the cell.

U.S. Pat. No. 4,797,185 to Polak, et al. discloses an electrochemical process involving hydrogen and gaseous compounds capable of dissociating into or combining with hydrogen ions using a solid electrolyte concentration cell. Specific applications are fuel cells for producing an electrical current and separation of hydrogen from a gaseous mixture. A solid electrolyte membrane is used which is an organic polymer-inorganic compound blend prepared by admixing an organic polymer such as poly(vinyl alcohol) with a phosphoric acid in a mutually miscible solvent. For increased strength, a membrane may be composited with or attached to a porous support and may be formed into a hollow fiber having electrically conductive particles with catalyst embedded in the fiber walls where a multiplicity of such fibers may be used to form a hydrogen separation device.

U.S. Pat. No. 4,710,278 to Polak, et al. discloses removing hydrogen from a gaseous mixture containing hydrogen or a component capable of dissociating into hydrogen ions using a solid electrolyte concentration cell. A solid electrolyte membrane is used which comprises an organic polymer-inorganic compound blend prepared by admixing an organic polymer such as poly(vinyl alcohol) with a heteropoly acid or salt thereof such as dodecamolybdophosphoric acid in a mutually miscible solvent.

U.S. Pat. No. 4,664,761 to Zupancic, et al. discloses an electrochemical process involving hydrogen and gaseous compounds capable of dissociating into or combining with hydrogen ions using a solid electrolyte concentration cell. Specific applications are fuel cells for producing an electrical current and separation of hydrogen from a gaseous mixture. A proton-conducting membrane consisting of an interpenetrating polymer network serves as the solid electrolyte. For increased strength, a membrane may be composited with or utilized with a porous support.

U.S. Pat. No. 4.620,914 to Abens, et al. discloses the purification of hydrogen with an assembly of anode and cathode gas diffusion electrodes, an electrolyte situated between the electrodes, first and second gas passages adjacent the electrodes and means for applying a voltage across the electrodes.

SUMMARY OF THE INVENTION

In an exemplary embodiment of the present invention, there is disclosed a method of purifying a hydrogen stream using an electrochemical cell comprising:

providing a cylindrical shaped member having a longitudinal axis, an electrically conductive outer shell, a first closed end and a second closed end;

locating a hollow wet polymeric membrane having a longitudinal axis between the first and second closed ends and parallel to the longitudinal axis of the cylindrical member to provide an inner compartment and an outer compartment;

locating an electrode having a longitudinal axis within and spaced from the hollow wet polymeric membrane;

providing a gas inlet for feeding a hydrogen stream that is to be purified to the inner compartment; and providing a gas outlet for passing purified hydrogen gas thru the outer shell of the cylindrical shaped member;

wherein the electrode within the hollow wet polymeric membrane is adapted to be connected to an anode terminal of a dc supply with an electrical conductor and the outer shell of the cylindrical shaped member is adapted to be connected to a cathode terminal of the dc supply with another electrical conductor.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

FIG. 6 is a perspective view of a bundled array of several fluid leak resistant spring type wound tube assemblies where electrical leads are omitted for clarity; and FIG. 7 is a perspective sectional view of the bundled array of several tube assemblies of FIG. 6 where the outer shell is partially removed and electrical leads are omitted for clarity.

DESCRIPTION OF THE PREFERRED EMBODIMENT

Highly efficient hydrogen production technologies from diverse sources including the reforming of natural gas or liquid fuels, bio-derived liquids such as ethanol, are needed. A specific technical objective is to reduce the cost of hydrogen production to be cost competitive with traditional fossil fuels as an energy source. Of several technologies, small scale natural gas reformers appear to be the closest to achieving cost targets. However, hydrogen separation and purification remains a major obstacle.

In general, the reforming process entails hydrocarbon introduction into a heated catalytic bed in the presence of steam, whereby the hydrocarbon breaks down to form hydrogen and carbon containing gases such as carbon dioxide and carbon monoxide. The product hydrogen must then be separated from these by-product gases as well as any residual fuel or partially reformed hydrocarbons. Hydrogen separation and purification is a major issue that cuts across several hydrogen production options. Well known separation processes such as cryogenic distillation, pressure-swing adsorption, temperature swing adsorption or high temperature metal membrane separators, are highly efficient but have cost disadvantages due to high energy consumption and capital equipment requirements.

For many hydrogen applications such as heating, petroleum refining or food processing, purity requirements are not stringent. However use of Hydrogen in semiconductor processes for the manufacture of photovoltaic cells, for analytical instrumentation or as fuel in a fuel cell requires very high purity. In these circumstances, carbon containing contaminants have detrimental effects on the systems and/or process. In some applications, hydrogen is purified by passage through a high temperature Palladium membrane to purity levels of 99.9999% or better. However, this process is very expensive due to the high cost of palladium, other high capital equipment costs and energy consumption associated with elevated operating temperatures of the membrane.

Electrochemical technologies for hydrogen separation and purification are of increasing interest due in part to potential advantages provided in energy efficiency and reduced capital equipment costs. Dilute Hydrogen may be separated from $CO_2$ and other carbon containing gases by means of electrochemical separation/purification as noted by Equations 1, and 2.

$$\text{Anode } H_2 \rightarrow H^+ + e^- \qquad (EQ. 1)$$

$$\text{Cathode } H^+ + e^- \rightarrow H_2 \qquad (EQ. 2)$$

Figure 1:
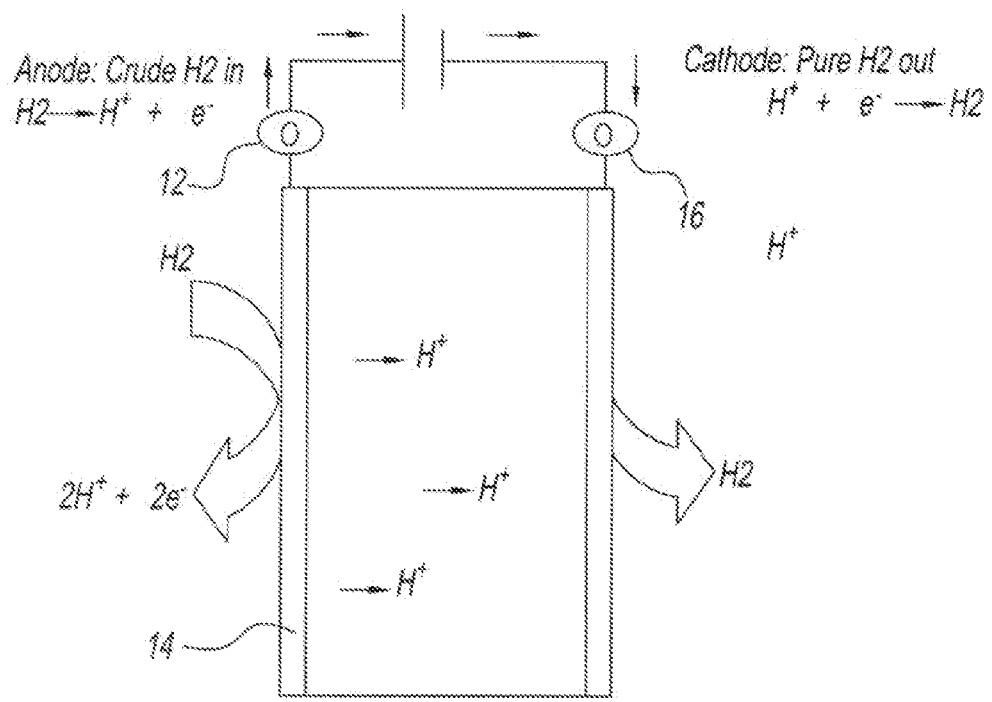
FIG. 1 illustrates the prior art mechanism of electrochemical hydrogen purification through a polymer electrolyte membrane.

Referring to FIG. 1 which shows the prior art mechanism of electrochemical hydrogen purification through a polymer electrolyte membrane, the working principle is that hydrogen gas is electrochemically oxidized at anode 12 to form protons ($H^+$), where the protons ($H^+$) are transported through a Polymer Electrolyte Membrane (PEM) 14, while contaminants are left behind in the anode compartment. The protons are electrochemically reduced on the cathode side 16 of the membrane in order to reform hydrogen gas. If the cathode compartment of the electrochemical cell is confined to a limited volume, hydrogen pressure will increase as more protons are converted to hydrogen gas. The net result is the production of purified and compressed hydrogen product.

Though these systems look very promising, many practical problems have been encountered in attempts to implement this technology. PEM systems lack durability and are prone to mechanical failure over time. This in part is due to the vast number of mechanical parts that are contained in these systems. These include, tightly compressed bipolar plates, catalyst materials, water maintenance systems, fragile graphite pads, membrane support screens, cell frames, flow field management systems and compression maintenance systems. The requirement for many of these parts and sub-systems can be attributed to an inefficient flat plate design. In addition, the use of a membrane as the primary electrolyte places undue burden on the entire system.

The invention disclosed is an energy efficient, low cost hydrogen separation/purification system which can be used in the presence of dilute hydrogen. In particular, durable electrochemical membrane separation with a reduced number of sub-system operations and lower maintenance requirements is obtained.

Figure 2:
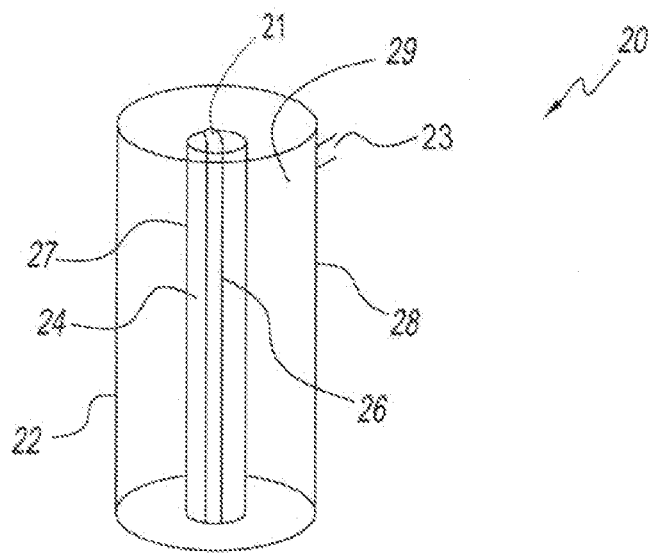
FIG. 2 shows a radial oriented electrochemical membrane tube assembly with a single hollow fiber where electrical leads are omitted for clarity.

Referring to FIG. 2, there is shown a hydrogen purification system 20 that is comprised of an aqueous electrochemical cell 22 with a radial orientation. A gas inlet 21 allows hydrogen to flow into the inner compartment of the device. A portion of an electrochemical cell is formed by the placement of an electrode (anode) 26 at the inner compartment of the radial design. The anode is covered with a wet polymeric membrane 27 which serves as an electrolyte and gas separator. For convenience, the anode 26 combined with the wet polymeric membrane 27 is called "electrochemical membrane tube assembly or tube membrane assembly or tube assembly." The radial oriented electrochemical cell is completed with an outer shell metal electrode 28, where the outer shell electrode 28 is connected to the inner electrode 26 through an electrical wire or other electrically conducting material, not shown. The shell may serve as the cathode as well as an outer housing for containment of the electrochemical cell. A gas outlet 23 is attached to the outer compartment (cathode compartment) which passes purified hydrogen that was released from the electrochemical cell and is collected for subsequent use.

The electrochemical tube assembly of FIG. 2 is sealed in a manner that separates inlet gases from outlet gases and only allows for proton transport through the membrane. On the inlet side, it may be necessary to periodically add water, or alternatively, a water vapor addition device can be added to wet the incoming hydrogen with high purity water vapor. Water vapor addition devices are readily available from Rasirc, Inc. of San Diego, Calif.

Build up of excess $CO_2$ and other contaminant gases will occur on the inlet side of the membrane. However, since conversion of $H_2$ to $H^+$ occurs almost instantaneously, it is possible to periodically vent these unwanted gases through an outlet port with only sparse hydrogen loss. These unwanted gases may be directed to a $CO_2$ sequestration system or other $CO_2$ recycling device.

The purified hydrogen will still contain small amounts of water vapor, however, this is not a problem for use with PEM fuel cells. In the case that water vapor needs to be removed from the purified hydrogen for other applications, several methods of moisture removal from hydrogen are known to those with ordinary skill in the art.

Continuing with FIG. 2, in an embodiment of the first aspect, the inner anode electrode 26 is constructed of a hollow porous metal membrane, such as sintered Ni or other Nickel alloys. The porous sintered metal membrane serves as the anode as well as a porous passageway for crude hydrogen gas to enter into the electrochemical cell. Porous metal membranes of this type are routinely used in the semiconductor industry as sintered metal filters or diffusers. Porous metal membranes of are available from Mott Corporation, in Farmington, Conn.

In an embodiment of the first aspect, the inner anode electrode may be constructed of Ni or Nickel alloys. In particular, alloys that provide more efficient anode properties are useful. These Nickel alloys may comprise Pt, Pd, Cr, Mo, Fe, Ta, Ru, Rh, W, Os, Ir, Zn, Co, Ti, Zr or other metals that improve anode efficiency for oxidation of hydrogen gas.

In an embodiment of the first aspect, the aqueous space 24 between the anode and the polymer electrolyte membrane may contain phosphoric acid or other Bronsted-Lowry acids. This provides additional electrolyte to facilitate proton transfer from the anode to the electrolyte membrane.

In an embodiment of the first aspect, the electrolyte membrane 27 is constructed of a perfluorinated ionomer comprising a copolymer of ethylene and a vinyl monomer containing an acid group or salts thereof. Exemplary perfluorinated ionomers include, but are not limited to, perfluorosulfonic acid/tetrafluoroethylene copolymers ("PFSA-TFE copolymer") and perfluorocarboxylic acid/tetrafluoroethylene copolymer ("PFCA-TFE copolymer"). These membranes are commercially available under the trade names NAFION® (E.I. du Pont de Nemours & Company), FLEMION® (Asahi Glass Company, Ltd), and ACIPLEX® (Asahi Chemical Industry Company).

In an embodiment of the first aspect, the aqueous space 29 between the electrolyte membrane and the outer shell electrode may contain phosphoric acid or other Bronsted-Lowry acids. This provides additional electrolyte to facilitate proton transfer from the electrolyte membrane to the cathode.

In an embodiment of the first aspect, the outer shell 28 may be constructed of Ni or Nickel alloys. In particular, alloys that provide more efficient cathode properties are useful. These Nickel alloys may comprise Pt, Pd, Cr, Mo, Fe, Ta, Ru, Rh, W, Os, Ir, Zn, Co, Ti, Zr or other metals that improve cathode efficiency for reduction of protons to hydrogen gas.

In an embodiment of the first aspect, electrical conductive wires are attached to an electrical power source. This power source may be an electrical outlet attached to the grid or an electrochemical battery with stored energy. The power source may also be derived from forms of alternative energy such as solar, wind or hydroelectric sources.

In an embodiment of the invention, the electrical conductors may comprise electrical leads composed of Ni or Ni alloys such as Ni—Al or Ni—Zn.

In an embodiment of the first aspect, the electrical conductors may include a measuring device such as a voltmeter or potentiometer.

In an embodiment of the first aspect, the gas outlet attached to the cathode compartment 29, the aqueous space between the electrolyte membrane and the outer shell electrode, may comprise a pressure sensitive valve. In this configuration, hydrogen may be released from the device at specific pressures.

In an embodiment of the first aspect, purified hydrogen may exit out of the outer shell compartment through a directional seal.

In an embodiment of the first aspect, the purified hydrogen may be subsequently compressed by mechanical or other methods after exiting the separation and purification device.

In an embodiment of the first aspect, a gas outlet is attached to the anode compartment to allow for periodic release of $CO_2$ and other gaseous contaminants.

In an embodiment of the first aspect, water vapor may be added to the crude hydrogen prior to introduction into the separation and purification device.

In an embodiment of the first aspect, liquid water and phosphoric acid may be circulated continuously through the anode and cathode compartments to aid in moving gas bubbles and to prevent dry spots from forming on the membrane surface.

In an embodiment of the first aspect, water and/or phosphoric acid may be flushed out of the anode and cathode compartments to remove unwanted residues, scales, or soluble contaminants. These solutions may be replaced with fresh water and/or phosphoric acid.

Figure 3:
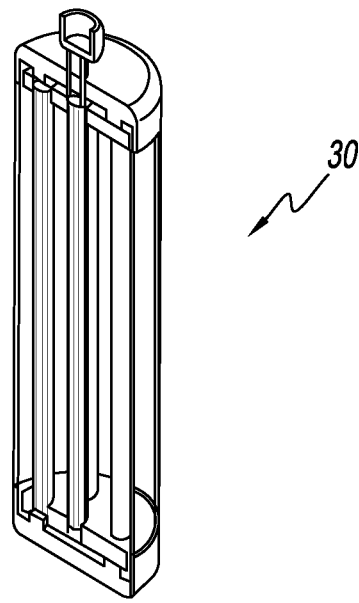
FIG. 3 is a perspective view of a vertical cross section of an array of several tube membrane assemblies.
Figure 4:
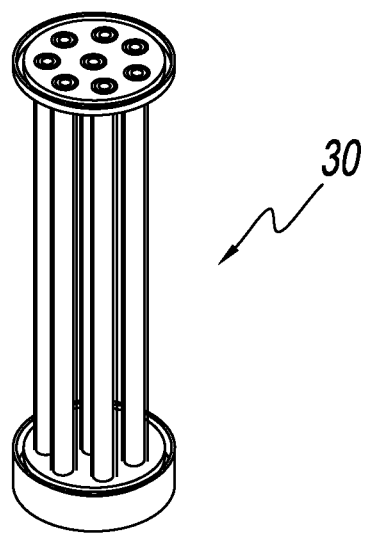
FIG. 4 is a perspective view of a bundled array with several tube assemblies where the outer shell is omitted for clarity.

Referring to FIGS. 3 and 4, in an embodiment of the first aspect, the hydrogen purification device comprises a bundled array 30 of electrochemical tube assemblies positioned substantially parallel with respect to each other. This design can maximize hydrogen flux in a nominal amount of space. Each bundled array of electrochemical tube assemblies increases surface area and leads to a small system footprint.

In an embodiment of the first aspect, non-water vapor contaminants level in the purified hydrogen gas is less than 100 ppm.

In an embodiment of the first aspect, non-water vapor contaminants level in the purified hydrogen gas is less than 1 ppm.

In an embodiment of the first aspect, non-water vapor contaminants level in the purified hydrogen gas is less than 100 ppb.

In an embodiment of the first aspect, non-water vapor contaminants level in the purified hydrogen gas less than 1 ppb.

In an embodiment of the first aspect, non-water vapor contaminants level in the purified hydrogen gas is less than 100 ppm and greater than 0.25 ppb.

In an embodiment of the first aspect, water vapor contaminant level in the purified hydrogen gas is less than 1 ppm.

In an embodiment of the first aspect, water vapor contaminant level in the purified hydrogen gas is less than 100 ppb.

In an embodiment of the first aspect, water vapor contaminant level in the purified hydrogen gas is less than 1 ppb.

In an embodiment of the first aspect, water vapor contaminant level in the purified hydrogen gas is less than 0.25 ppm and greater than 0.25 ppb.

Figure 5:
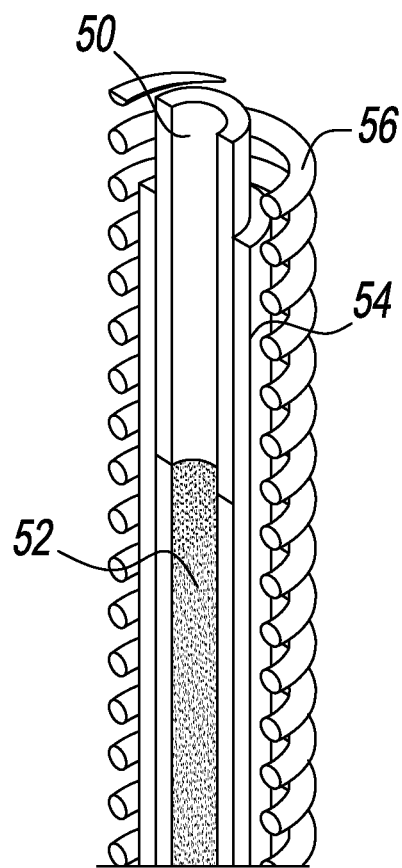
FIG. 5 is a sectional perspective view of a single radial oriented electrochemical membrane tube assembly with an outer fluid leak resistant spring type wound cathode electrode where electrical leads are omitted for clarity.

Referring to FIG. 5, there is shown a second aspect of the invention where a hydrogen purification system is comprised of an aqueous electrochemical cell with a radial orientation. A gas inlet 50 allows hydrogen to flow into the inner compartment of the device. A portion of an electrochemical cell is formed by the placement of an electrode (anode) 52 at the inner compartment of the radial design. This anode is covered with a wet polymeric membrane 54 which serves as an electrolyte and gas separator. The radial oriented electrochemical cell is completed with an outer metal electrode in the form of a metal spring 56 which surrounds the polymer electrolyte membrane, where the outer spring electrode is connected to the inner electrode through electrical conducting wires or other electrically conducting material. The spring 56 may serve as the cathode as well as provide pressure to mechanically seal the electrochemical cell. The entire electrochemical cell is enclosed by a shell, not shown, constructed of a suitable material. A gas outlet is attached to the outer compartment (cathode compartment) in order that purified hydrogen may be released from the electrochemical cell and collected for subsequent use.

In an embodiment of the second aspect, the inner anode electrode 52 is constructed of a hollow porous metal membrane, such as sintered Ni or other Nickel alloys. The porous sintered metal membrane serves as the anode as well as a porous passageway for crude hydrogen gas to enter into the electrochemical cell.

In an embodiment of the second aspect, the inner anode electrode 52 may be constructed of Ni or Nickel alloys. In particular, alloys that provide more efficient anode properties are useful. These Nickel alloys may comprise Pt, Pd, Cr, Mo, Fe, Ta, Ru, Rh, W, Os, Ir, Zn, Co, Ti, Zr or other metals that improve anode efficiency for oxidation of hydrogen gas.

In an embodiment of the second aspect, an aqueous space between the anode 52 and the polymer electrolyte membrane 54 may contain phosphoric acid or other Bronsted-Lowry acids. This provides additional electrolyte to facilitate proton transfer from the anode to the electrolyte membrane.

In an embodiment of the second aspect, the electrolyte membrane 54 is constructed of a perfluorinated ionomer comprising a copolymer of ethylene and a vinyl monomer containing an acid group or salts thereof. Exemplary perfluorinated ionomers include, but are not limited to, perfluorosulfonic acid/tetrafluoroethylene copolymers ("PFSA-TFE copolymer") and perfluorocarboxylic acid/tetrafluoroethylene copolymer ("PFCA-TFE copolymer"). These membranes are commercially available under the trade names NAFION® (E.I. du Pont de Nemours & Company), FLEMION® (Asahi Glass Company, Ltd), and ACIPLEX® (Asahi Chemical Industry Company).

In an embodiment of the second aspect, the aqueous space between the electrolyte membrane 54 and the outer spring electrode 56 may contain phosphoric acid or other Bronsted-Lowry acids. This provides additional electrolyte to facilitate proton transfer from the electrolyte membrane to the cathode.

In an embodiment of the second aspect, the outer spring electrode 56 may be constructed of Ni wire or Nickel alloy wire. In particular, alloys that provide more efficient cathode properties are useful. These Nickel alloys may comprise Pt, Pd, Cr, Mo, Fe, Ta, Ru, Rh, W, Os, Ir, Zn, Co, Ti, Zr or other metals that improve cathode efficiency for reduction of protons to hydrogen gas.

In an embodiment of the second aspect, the outer shell may be constructed of Ni, Nickel alloy, Stainless Steel 316L, or suitable polymeric materials.

In an embodiment of the second aspect, the electrical conducting wires are attached to an electrical power source. This power source may be an electrical outlet attached to the grid or an electrochemical battery with stored energy. The power source may also be derived from forms of alternative energy such as solar, wind or hydroelectric sources.

In an embodiment of the second aspect, the electrical conducting wires may comprise electrical leads composed of Ni or Ni alloys such as Ni—Al or Ni—Zn.

In an embodiment of the second aspect, the electrical conducting wires may include a measuring device such as a voltmeter or potentiometer.

In an embodiment of the second aspect, the gas outlet attached to the cathode compartment may comprise a pressure sensitive valve. In this configuration, hydrogen may be released from the device at specific pressures.

In an embodiment of the second aspect, the purified hydrogen may be subsequently compressed by mechanical or other methods after exiting the separation and purification device.

In an embodiment of the second aspect, purified hydrogen may exit out of the outer shell compartment through a directional seal.

In an embodiment of the second aspect, a gas outlet is attached to the anode compartment to allow for periodic release of $CO_2$ and other gaseous contaminants.

In an embodiment of the second aspect, water vapor may be added to the crude hydrogen prior to introduction into the separation and purification device.

In an embodiment of the second aspect, liquid water and phosphoric acid may be circulated continuously through the anode and cathode compartments to aid in moving gas bubbles and to prevent dry spots from forming on the membrane surface.

In an embodiment of the second aspect, water and/or phosphoric acid may be flushed out of the anode and cathode compartments to remove unwanted residues, scales, or soluble contaminants. These solutions may be replaced with fresh water and/or phosphoric acid.

Referring to FIGS. 6, and 7, in an embodiment of the second aspect, the hydrogen purification device comprises a bundled array 60 of electrochemical tube assemblies with springs positioned substantially parallel with respect to each other. This design can maximize hydrogen flux in a nominal amount of space. Each bundled array of electrochemical tube assemblies increases surface area and leads to a small system footprint.

In an embodiment of the second aspect, non-water vapor contaminants level in the purified hydrogen gas is less than 100 ppm.

In an embodiment of the second aspect, non-water vapor contaminants level in the purified hydrogen gas is less than 1 ppm.

In an embodiment of the second aspect, non-water vapor contaminants level in the purified hydrogen gas is less than 100 ppb.

In an embodiment of the second aspect, non-water vapor contaminants level in the purified hydrogen gas less than 1 ppb.

In an embodiment of the second aspect, non-water vapor contaminants level in the purified hydrogen gas is less than 100 ppm and greater than 0.25 ppb.

In an embodiment of the second aspect, water vapor contaminant level in the purified hydrogen gas is less than 1 ppm.

In an embodiment of the second aspect, water vapor contaminant level in the purified hydrogen gas is less than 100 ppb.

In an embodiment of the second aspect, water vapor contaminant level in the purified hydrogen gas is less than 1 ppb.

In an embodiment of the second aspect, water vapor contaminant level in the purified hydrogen gas is less than 0.25 ppm and greater than 0.25 ppb.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A method of purifying a hydrogen stream using an electrochemical cell comprising:
   providing a cylindrical shaped outer metal electrode member having a longitudinal axis for containment of said electrochemical cell;
   locating at least one hollow wet polymeric membrane having a longitudinal axis parallel to the longitudinal axis of said cylindrical outer metal electrode member to provide an inner compartment and an outer compartment;
   locating at least one porous sintered metal electrode in a form of tubular sintered metal filter having a longitudinal axis within said hollow wet polymeric membrane;
   providing at least one gas inlet for feeding a hydrogen stream that is to be purified to the inner compartment; and
   providing a gas outlet for passing purified hydrogen gas thru the outer shell of the cylindrical shaped member;
   wherein said porous sintered metal electrode is adapted to be connected to an anode terminal of a dc supply with an electrical conductor to work as an anode and said cylindrical outer metal electrode member is adapted to be connected to a cathode terminal of the dc supply with another electrical conductor to work as a cathode;
   wherein said porous sintered metal electrode acts as an anode and a porous qas conduit which allows qas flows from said qas inlet into pores of said porous sintered metal electrode where the qas reacts to form protons which then migrate across the polymeric membrane, one said porous sintered metal electrode combined with one said polymeric membrane to form one electrochemical tube assembly.

2. The method of claim 1 wherein said outer metal electrode has an electrically conductive outer shell which is in the form of a sheet of metal, a first closed end and a second closed end for working as a housing for containment of said electrochemical cell.

3. The method of claim 2 wherein said porous sintered metal electrode is made of Ni or Nickel alloys which comprise a metal that improves anode efficiency for oxidation of hydrogen gas selected from the group consisting of Pt, Pd, Cr, Mo, Fe, Ta, Ru, Rh, W, Os, Ir, Zn, Co, Ti, and Zr.

4. The method of claim 2 wherein the space between the electrode within and spaced from said hollow wet polymeric membrane and said wet polymeric membrane contains phosphoric acid or other Bronsted-Lowry acids.

5. The method of claim 2 wherein said wet polymeric membrane is constructed of a perfluorinated ionomer comprising a copolymer of ethylene and a vinyl monomer containing an acid group or salts.

6. The method of claim 2 wherein the space between the wet polymeric membrane and outer shell contains phosphoric acid or other Bronsted-Lowry acids.

7. The method of claim 2 wherein said outer shell is made of Ni or Nickel alloys which comprise a metal that improves anode efficient cathode properties selected from the group consisting of Pt, Pd, Cr, Mo, Fe, Ta, Ru, Rh, W, Os, Ir, Zn, Co, Ti, and Zr.

8. The method of claim 2 wherein the electrical conductors are composed of Ni or Ni alloys.

9. The method of claim 8 wherein a voltmeter or a potentiometer is coupled to one of said electrical conductors.

10. The method of claim 2 wherein a pressure sensitive valve is attached to the gas outlet to allow hydrogen to be released at a specific pressure.

11. The method of claim 2 wherein the gas outlet is a directional seal.

12. The method of claim 2 wherein a gas compression means is provide to compress the purified hydrogen gas which passes thru the outer shell of the cylindrical shaped member.

13. The method of claim 2 wherein a gas outlet means is located to communicate with said inner compartment to provide for periodic release of $CO_2$ and other gaseous contaminants.

14. The method of claim 2 wherein water vapor adding means is coupled to the gas inlet for feeding water vapor to the hydrogen stream that is to be purified to the inner compartment prior to the hydrogen stream entering the inner compartment.

15. The method of claim 2 wherein liquid water and phosphoric acid is circulated continuously through the inner and outer compartments to aid in moving gas bubbles and preventing dry spots from forming on the membrane surface.

16. The method of claim 15 wherein the liquid water and phosphoric acid is flushed from the inner and outer compartments to remove unwanted residues, scales, or soluble contaminants.

17. The method of claim 1 wherein a plurality of said electrochemical tube assemblies are positioned parallel with respect to each other and are located within one single said cylindrical outer metal electrode member which is closed at each end to maximize hydrogen flux in a nominal amount of apace, and the gas inlets of each tube assemblies are connected to a common gas inlet.

18. The method of claim 1 wherein said outer metal electrode is in a form of a tightly wound leak resistant metal spring surrounded by a shell of non-conductive material for working as an outer housing for containment of said electrochemical cell.

* * * * *